United States Patent Office 3,521,911
Patented July 28, 1970

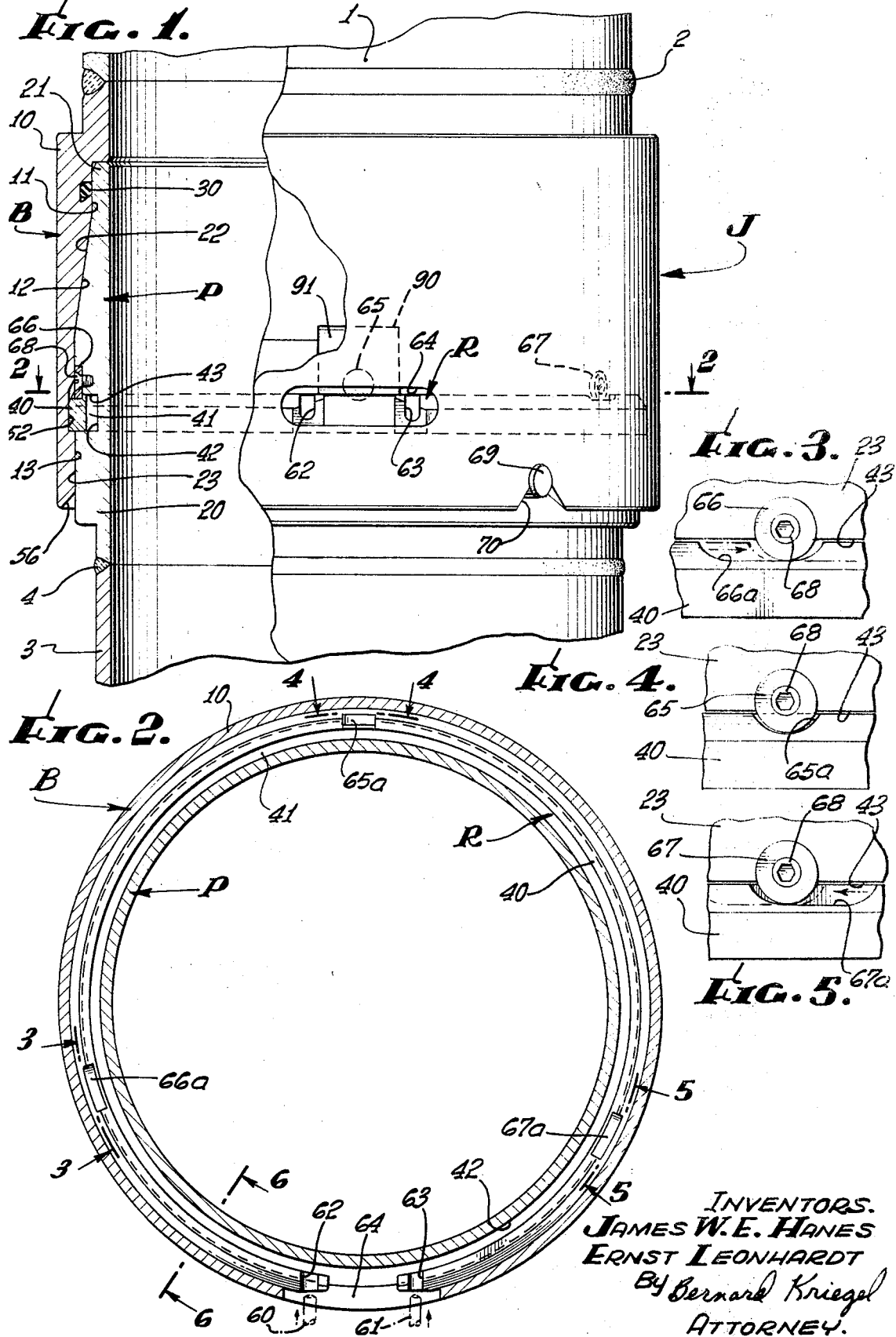

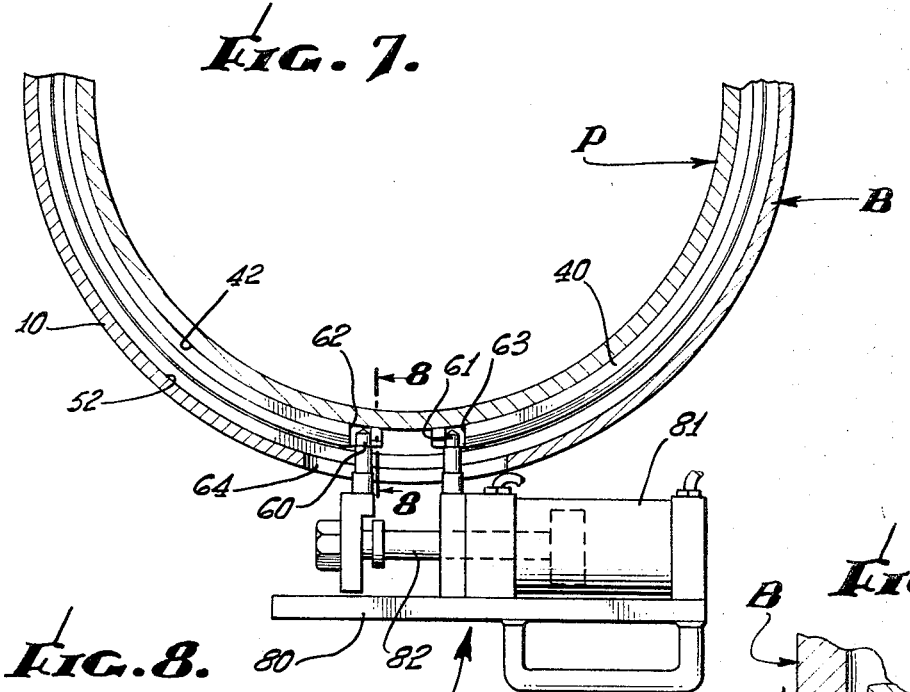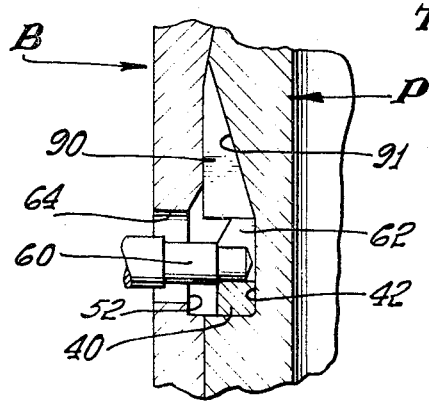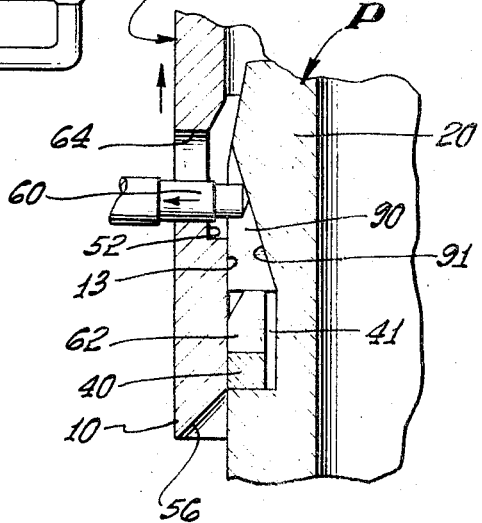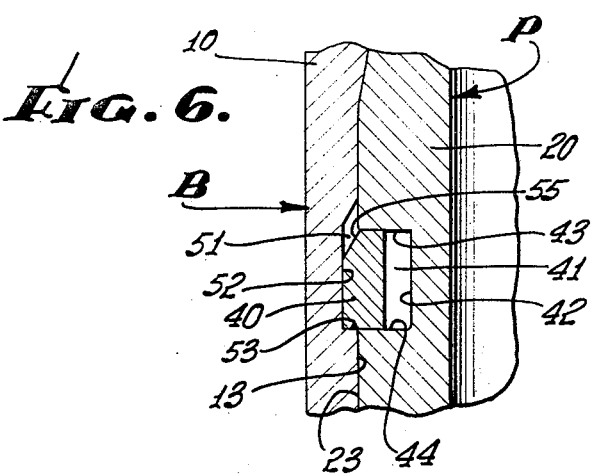

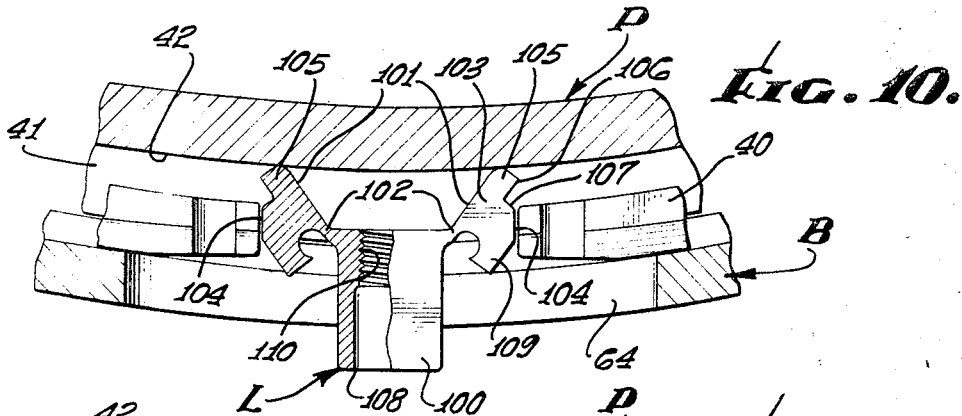
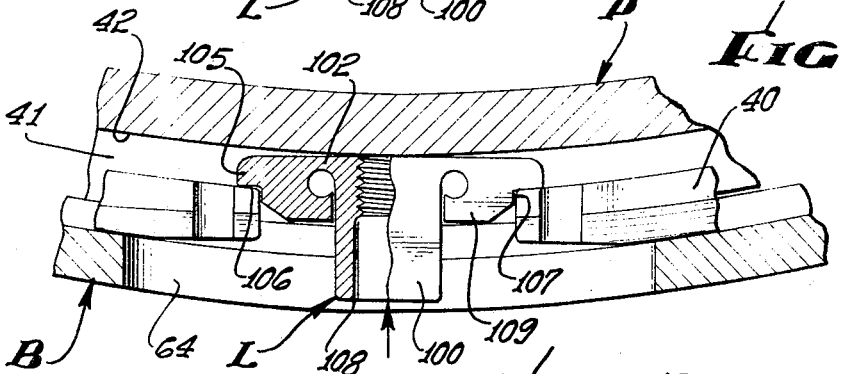
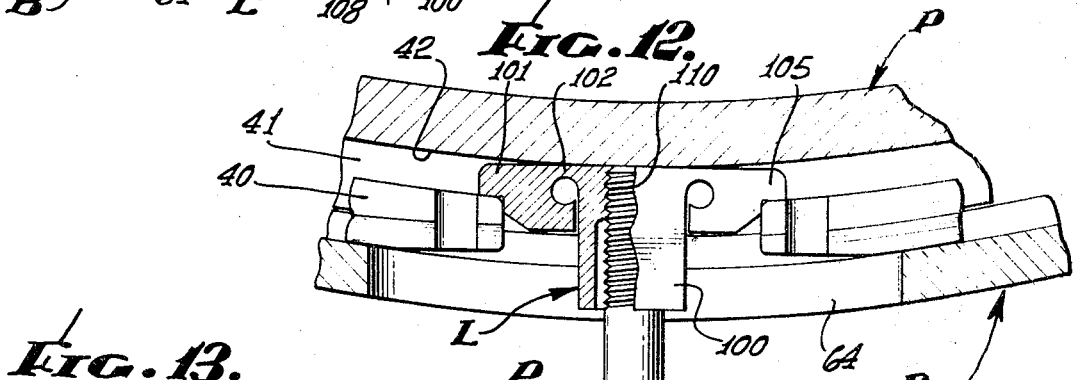
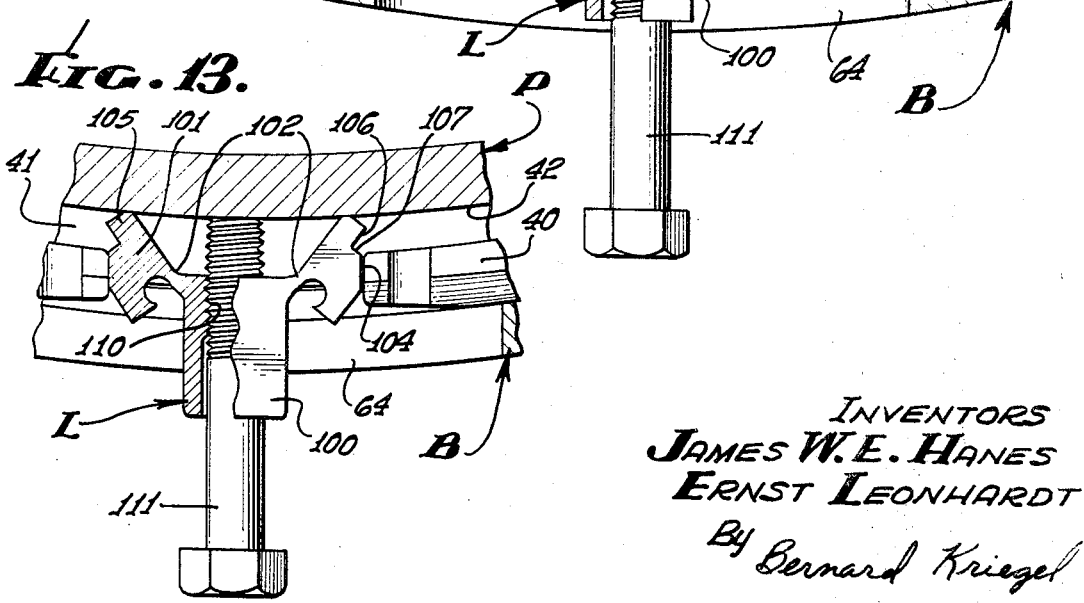

3,521,911
LOCKABLE AND UNLOCKABLE, RELEASABLE TOOL JOINTS
James W. E. Hanes, Ventura, Calif., and Ernst Leonhardt, Celle, Germany, assignors to Vetco Offshore Industries, Inc., Ventura, Calif., a corporation of California
Filed Mar. 6, 1968, Ser. No. 711,039
Int. Cl. F16l 55/00
U.S. Cl. 285—27       18 Claims

ABSTRACT OF THE DISCLOSURE

A releasably connectible tool joint including a pin member and a complemental box member connectible together by a split latch ring, the latch ring being releasable by a tool for changing the latch ring diameter, the tool being automatically disconnected from the latch ring upon separation of the pin and box members, and a releasable lock for preventing inadvertent change in the latch ring diameter.

---

The present invention relates to joints for pipe, such as well pipe or conductor pipe, employed in the drilling of wells from platforms or vessels at sea, such pipe being composed of lengths of pipe releasably interconnected by tool joints or couplings comprising a "box" on one pipe end and a "pin" on a complemental pipe end adapted to be coengaged and interlocked together.

In the use of such pipe joints, it has been found that repeated releasing and reconnection of the joints and the working of the joints, due to wave action in the case of underwater utility, result in wear which is detrimental to the locking efficiency of the latch ring.

Accordingly, an object of the present invention is to provide a releasable pipe joint as referred to above, which avoids the above-noted problem, and which is simple to employ, rugged, and well-suited to its intended purposes.

More specifically, an object of the invention is to provide a releasable pipe joint including complemental pin and box sections, a circumferentially expansible and contractible latch ring being carried by one joint section and engageable in a latch groove in the other joint section, the latch ring being engageable by an operating tool whereby the latch ring may be released, and the joint sections being so constructed as to cause the automatic disengagement of the tool from the latch ring as the result of separation of the joint sections.

Another object is to provide a pipe joint or coupling of the type wherein an expansible latch ring carried by one joint section is engageable in a latch groove in the other joint section, the latch ring having a split, and the joint being so constructed as to permit the insertion between the ends of the split ring of a releasable lock which is not subject to failure due to working of the joint or vibration caused by pile driving pipe embodying such joints, as in the case of certain well conductor pipes.

More particularly, an object is to provide a malleable lock adapted to be deformed between the ends of the split latch ring so as to retain the ring in a fully expanded condition until the malleable lock is removed.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:
FIG. 1 is a view, partly in side elevation and partly in vertical section, showing a joint in accordance with the invention;
FIG. 2 is a transverse sectional view taken on the line 2—2 of FIG. 1;
FIG. 3 is a fragmentary detail view taken on the line 3—3 of FIG. 2;
FIG. 4 is a fragmentary detail view taken on the line 4—4 of FIG. 2;
FIG. 5 is a fragmentary detail view taken on the line 5—5 of FIG. 2;
FIG. 6 is a fragmentary sectional view taken on the line 6—6 of FIG. 2;
FIG. 7 is a fragmentary transverse sectional view showing a tool applied to the latch ring of the joint and the ring contracted by the tool;
FIG. 8 is a fragmentary sectional view taken on the line 8—8 of FIG. 7;
FIG. 9 is a view like FIG. 8 showing the joint partially separated and the tool released from the ring;
FIG. 10 is a fragmentary transverse sectional view showing a deformable lock member disposed between the ends of the latch ring preliminary to deformation of the latch member to a locking position;
FIG. 11 is a view corresponding to FIG. 10 showing the latch member deformed;
FIG. 12 is a view corresponding to FIG. 11 showing the application of a latch removal tool to the latch member; and
FIG. 13 is a view corresponding to FIG. 12 showing the latch member deformed to its original shape for removal from the joint.

Referring to FIG. 1, the illustrated embodiment of the invention is shown as incorporated in a joint J composed of a box section B and a pin section P, the box section B being suitably made as a part of, or integrated to, an upper length of pipe 1, as by welding at 2, and the pin section P being suitably made as a part of, or integrated to, a downwardly extended length of pipe 3, as by welding at 4. When the joint J is connected, as seen in FIG. 1, the joined lengths of pipe 1 and 3 may comprise, for example, a portion of a well conductor pipe extending downwardly from a floating marine vessel or drilling platform into a well bore, as will be understood by those familiar with the drilling and completion of underwater oil, gas, and similar wells.

The box section B of the joint J has a generally cylindrical body 10 provided with an inner bore or cylindrical wall 11, a downwardly flaring wall 12, and a lower inner bore or cylindrical wall 13. The pin section P has a generally cylindrical body 20 provided with an upper cylindrical end 21 adapted to fit within the box bore 11, the pin section also having a tapered wall 22 adapted to fit within and conforming to the box wall 12, as well as a lower cylindrical wall 23 adapted to fit within the bore 13 of the box section B.

Means are provided for sealing the joint J, including suitable sealing ring means 30 interposed between the complemental walls 11 and 21 of the box and pin sections, respectively.

In addition, means are provided, a generally denoted at R, for releasably latching the joint sections B and P together. This releasable latch means comprises a split, resilient ring 40 which is circumferentially expansible and contractible to effectively latch the joint sections together and to release the joint sections for axial separation. One of the joint sections B and P, and in the illustrative embodiment the pin section P, has a ring supporting, annular groove 41 in which the ring 40 is carried when the joint sections are separated, this groove 41 having a cylindrical base wall 42 and upper and lower groove walls 43 and 44, respectively, of a radial dimension equal to or greater than the radial thickness of the latch ring 40, whereby, in a stressed condition or in its circumferentially contracted form, the ring 40 will be wholly disposed within the groove 41. In its expanded or normal, relaxed condition, however, the ring 40 is adapted to project outwardly beyond the wall 23 of the pin body 20 and into a groove 51 in the wall 13 of box section B, as seen in FIGS. 1, 2 and 6. This groove 51 has a cylindrical base wall 52 of such a diameter as to limit outward expansion of the ring 40, so that, as best seen in FIG. 6, the ring 40 will be engaged with the lower wall 53 of the groove 51 and, at the same time, with the upper wall 43 of the groove 41 of the pin section P. Thus, when the ring 40 is in its normal or inherently expanded form, the joint sections P and B will be effectively latched against axial separation.

Means are provided whereby the latch ring 40 will be automatically contracted as the pin P and box B are being interconnected. Such means may comprise camming means, including a bevelled wall 55 at the upper outer edge of the ring 40 adapted to be engaged by the lower extremity of the box section body 10, and/or a bevelled wall 56 at the lower end of the box section body 10, which bevelled wall or walls will circumferentially compress or cause contraction of the ring 40 as the pin section P moves relatively axially into the box section B.

Inasmuch as it is desired that the joint be releasable, the ring 40 is provided with means at its ends, that is, at the split in the ring, for engagement by a contracting tool T, hereinafter to be more fully described, but including, as seen in phantom lines in FIG. 2, ring engaging fingers 60 and 61. The ring 40 has upwardly opening slots 62 and 63 in its ends, these slots extending laterally through the ring ends. In order to allow access of the fingers 60 and 61 of the tool T into the slots 62 and 63, the box section B is provided with an opening or window 64.

For reasons which will be hereinafter more fully apparent, it is desired that means be provided for assuring that the ring 40 can be initially properly assembled with the pin section P in the condition illustrated, namely, with the slots 62 and 63 in the ring ends facing upwardly and also with the same surface 55 of the ring facing upwardly.

Accordingly, as seen in FIGS. 3, 4 and 5, a number of projections are provided on the pin body wall 23, in the form of buttons 65, 66 and 67, suitably secured to the pin by fasteners 68. These projections each extend downwardly into the annular groove 41 slightly below the top wall 43 of the groove. The ring 40 is provided with a number of depressions 65a, 66a and 67a in its upper edge corresponding in number and angular relationship with the buttons 65, 66 and 67. Thus, when the ring 40 is in the groove 41, the buttons 65, 66 and 67 require that the ring not only be right side up, as previously mentioned, but in an angular relationship such that the buttons are engageable in the respective depressions 65a, 66a and 67a.

This just-mentioned angular relationship, therefore, is established and known. In order to assure registry of the box window 64 with the region of the pin where the ends of the ring 40 are located, as seen in FIGS. 1 and 2, it is only necessary to provide coengageable means on the pin and box sections P and B for fixing their relative orientation when the joint parts are joined. Such coengageable orienting means is herein illustrated simply as a pin 69 carried by the pin section P and a pin receiving slot 70 opening downwardly at the lower end of the box section B. When the joint is being connected, it will be recognized that the orienting pin 69 will prevent axial movement of the box section B onto the pin section P to a sufficient extent so as to allow registry of the ring 40 with the groove 51 in the box section, unless the pin is fully in the orienting slot 70.

In order to enable release of the latch ring 40 from the box groove 51, as previously mentioned, the ring 40 is reduced circumferentially. Therefore, the relationship of the buttons 66 and 67 to the ring 40 must be allowed to change circumferentially of the ring 40. Thus, as seen in FIGS. 3 and 5, the depressions 66a and 67a in ring 40 are elongated oppositely in respect of a normal relationship to the buttons 66 and 67 when the ring 40 is relaxed or in its normal, expanded condition. Depression 66a is elongated to the left, while depression 67a is elongated to the right relative to the respective buttons 66 and 67, so that, in response to circumferential contraction of the ring 40, movement of the ring segments in the direction of the arrows in FIGS. 3 and 5 will be permitted as the ring contracts.

Contraction of the ring 40, as previously indicated, is accomplished by moving the ends of the split ring toward one another by the fingers 60 and 61 of the tool T, when these fingers are engaged in the upwardly opening slots 62 and 63 in the ends of the ring 40. Such a tool T is generally shown in FIG. 7, and may comprise a support 80 having an actuator cylinder 81, including a rod 82 movable by the application of fluid pressure to the cylinder from a source (not shown). Finger 61 of the tool is fixed on the support, while finger 60 is carried by the rod 82, so that the fingers are movable forcibly one toward the other.

In order to engage the tool fingers 60 and 61 in the ring end slots 62 and 63, the fingers are inserted through the window 64 of the box B. However, in order to enable removal of the pin section P from the box section B, the fingers 60 and 61 must be withdrawn from the groove 41 into which they project while contracting the ring 40. Thus, as seen best in FIGS. 8 and 9, the pin section P is provided with an opening 90 above the groove 41 in the region of the ends of ring 40. The base of the opening 90 is formed by an inclined wall 91 leading from the outer wall of the pin section P downwardly to a location at which the wall 91 merges with the base wall 42 of the slot 41. As best seen in FIG. 1, registry of the opening 90 in the pin with the window 64, and thereby with the ring ends, is accomplished by the buttons 65, 66 and 67, previously referred to. Now, it is apparent that, when the ring 40 is contracted by the fingers of the tool T, as seen in FIGS. 7 and 8, and the joint is then separated axially, as seen in FIG. 9, the tapered surface 91 will engage the pins 60 and 61, camming them outwardly as they pass upwardly out of the slots 62 and 63 in the ends of the ring, thereby allowing the ring to again expand only after the box section B has moved relative to the pin section P a distance such that the ring can no longer reengage in the groove 51 within the box section B, but, instead, engages the cylindrical inner wall 13 of the box.

As indicated hereinabove, repeated uses of the joint assembly thus far described, or working of the joint J during use, may cause wear resulting in the failure of the latch means to hold effectively. Thus, in accordance with the invention, locking means, now to be described, are provided whereby the latch ring 40 may be releasably locked in its expanded, joint latching condition.

Such a locking means is generally denoted at L in FIGS. 10 to 13. In its illustrative form, the locking means L comprises a body 100 having a pair of oppositely, outwardly projecting arms 101 joined to the body by a reduced or thin wall section 102. Each arm includes a midsection 103 of substantial mass having an outer surface 104 disposed, when the lock means is in a normal shape, as seen in FIGS. 10 and 13, in parallel relation and adapted to fit between the opposing ends of the latch ring 40. Each lock arm 101 further includes an end extension 105 extending outwardly at an angle from the midsection 103 for abutting and sliding engagement with the base wall 42 of the groove 41 of the pin section P. It is to be noted that the end extensions 105 together have a span which enables the lock to be placed in the groove 41 between the ends of the latch ring 40. In addition, between the end extension 105 of each lock arm and the outer surface 104 is an angular seat, including a bottom wall 106 and an inner end wall 107. The lock member L, or at least its arms 101 and the thin-walled connection 102 to the body 100, is composed of malleable or ductile material, so that the lock member is capable of being deformed, as shown in FIG. 11, without rupture, and to retain its deformed shape, as well as preferably being capable of being returned to its original shape.

An outer end 108 of the lock body 100 projects outwardly through the window 64 of the box section B so as to enable engagement by a tool capable of effecting locking deformation of the lock arms 101. For example, the outer end 108 may be struck with a hammer to effect such deformation, as a simple mode of operation. In any event, when the body 100 is hammered or otherwise moved inwardly, as shown in FIG. 11, the thin-walled, bendable connections 102 will allow the midsections to swing outwardly in response to the spreading of the arms, as the end extensions 105 slide along the base wall 42 of the groove 41 in the pin section P. Expansion of the arms of the locking member L is assured by the angular relation of the arms 101 and their end extensions 105 to the body 100 and the base wall 42 of the groove 41. This is to say, these arms or the portions thereof which engage the base wall 42 are divergent. When the arms 101 are fully spread, the body 100 at its inner end will abut the base wall 42 of the groove 41, limiting further inward movement of the body and spreading of the arms 101. At this time, the end extensions 105 will be inside of the ends of the ring 40, and these ring ends will engage and overlap both the walls 106 and the walls 107 of the seats formed by the end extensions 105. Thus, the ring 40 will be positively held in an expanded condition. The inherent expansibility of the ring 40 is not solely relied upon to maintain the joint latched, but, instead, the lock means L provides, in essence, a rigid bar holding the ring 40 circumferentially expanded.

Finally, each arm 101 of the lock member L is provided with a stop portion 109 which extends toward the body 100 when the arms are spread, these stop portions being capable of abutting engagement with the body 100 to prevent movement of the ends of the latch ring 40 toward one another.

Since it is desirable that the lock means L be releasable, the body 100 is bored and threaded at 110 to receive a bolt 111 or other lock removal tool (FIG. 12). When the bolt 111 is threaded through the thread 110, the inner end of the bolt will engage the base wall 42 of the groove 41 in the pin section P, continued inward threading of the bolt causing outward movement of the body 100. Such outward movement will be resisted by engagement of the lock arm end extensions 105 beneath the ends of the latch ring 40, so that the arms 101 will bend at the connections 102 and will be caused to assume their original condition, as seen in FIG. 13, as the bolt 111 is rotated to force the lock member L outwardly. The lock bar L can then be pulled out through the window 64 and the joint J disconnected by use of the tool T, as previously described.

We claim:

1. In a tool joint: a box section having an internal circumferential groove; a pin section receivable in said box section and having an external circumferential groove; said grooves each defined by two side walls and a bottom wall; an expandable and contractable split latch ring in one of said grooves and movable partially into the other of said grooves upon movement of said pin section into said box section, said ring having opposing ends at its split provided with axially opening slots engageable by tool means for effecting movement of said ring completely out of said other of said grooves upon relative circumferential movement of said ends of said latch ring; one of said sections being provided with means for forcing said tool means radially outwardly of said section having said one of said grooves as said joint sections move axially apart.

2. In a tool joint: a box section having an internal circumferential groove; a pin section receivable in said box section and having an external circumferential groove; said grooves each defined by two side walls and a bottom wall; an expandable and contractable split latch ring in one of said grooves and movable partially into the other of said grooves upon movement of said pin section into said box section, said ring having opposing ends at its split provided with axially opening slots engageable by tool means for effecting movement of said ring completely out of said other of said grooves upon relative circumferential movement of said ends of said latch ring; wherein said box section has a window adjacent said ends of said latch ring, said pin section being provided with means for forcing said tool means radially outwardly in said window out of said one of said grooves as said joint sections move axially apart.

3. A tool joint as defined in claim 2; said joint sections being provided with orienting means for aligning said window with said ends of said latch ring upon connection of said joint sections.

4. A tool joint as defined in claim 2; one of said joint sections and said latch ring having means for positioning said ends of said latch ring adjacent said means for forcing said tool means outwardly upon assembly of said latch ring with said one of said joint sections.

5. A tool joint as defined in claim 2; one of said joint sections and said latch ring having means for positioning said ends of said latch ring adjacent said means for forcing said tool means outwardly upon assembly of said latch ring with said one of said joint sections, said joint sections being provided with orienting means for aligning said window with said ends of said latch ring upon connection of said joint sections.

6. In a tool joint; a box section having an internal circumferential groove; a pin section receivable in said box section and having an external circumferential groove; said grooves each defined by two side walls and a bottom wall; a normally expanded contractable split latch ring in said external groove; means for contracting said split ring upon movement of said pin section into said box section, said split ring expanding partially into said internal groove when said grooves are laterally aligned; means for enabling the application of a ring contracting tool to the ends of said ring adjacent said split to contract said ring completely out of said internal circumferential groove, including slots in said ends of said ring opening axially thereof and into which the tool is inserted, and a cam surface merging with the bottom wall of said external groove adjacent said ends of said ring and engaged by the tool to shift the tool laterally outwardly of said pin section as said joint sections move axially apart.

7. A tool joint as defined in claim 6; wherein said box section is provided with a window adjacent said ends of said ring for reception of the ring contracting tool when said joint sections are latched together by said ring.

8. A tool joint as defined in claim 6; wherein said box section is provided with a window adjacent said ends of said ring for reception of the ring contracting tool when said joint sections are latched together by said ring, said pin section and said ring having means for positioning said ends of said ring adjacent said cam surface, and said joint sections having means for orienting said sections to locate said window adjacent said ends.

9. In a tool joint: a box section having an internal circumferential groove; a pin section receivable in said box section and having an external circumferential groove; said grooves each defined by two side walls and a bottom wall; a normally expanded contractable split latch ring in said external groove; means for contracting said split ring upon movement of said pin section into said box section, said split ring expanding partially into said internal groove when said grooves are laterally aligned; and lock means movable radially into said external groove and between said ends of said latch ring when said sections are latched together by said latch ring to retain said latch ring in its expanded condition in said internal groove, and coengageable means on said lock means and said split latch ring retaining said lock means in its locking position between said ends of said latch ring.

10. A tool joint as defined in claim 9; wherein said lock means comprises a deformable malleable member adapted to be shifted radially and circumferentially of said grooves into its locking position between the ends of said latch ring.

11. In a tool joint: a box section having an internal circumferential groove; a pin section receivable in said box section and having an external circumferential groove; said grooves each defined by two side walls and a bottom wall; a normally expanded contractable split latch ring in said external groove; means for contracting said split ring upon movement of said pin section into said box section, said split ring expanding partially into said internal groove when said grooves are laterally aligned; and lock means removably disposable between said ends of said latch ring when said sections are latched together by said latch ring; wherein said lock means comprises a deformable malleable member, said member having a body, and a pair of arms projecting from said body for engagement with the bottom wall of said external groove, said arms being spreadable by said bottom wall into engagement with the ends of said split ring upon movement of said body into said external groove.

12. A tool joint as defined in claim 11; said arms having means engageable with said ends of said ring for releasing said lock upon movement of said body out of said external groove.

13. A tool joint as defined in claim 11; said arms having means engageable with said ends of said ring for releasing said lock upon movement of said body out of said external groove, and said body having means engageable by means for effecting said outward movement of said body.

14. A tool joint as defined in claim 11; said arms having means engageable with said ends of said ring for releasing said lock upon movement of said body out of said external groove, and said body having a threaded bore for reception of a threaded member, said bore leading into said external groove, whereby said threaded member will engage the bottom wall of said external groove to force said body outwardly upon rotation of said threaded member.

15. In a tool joint: a box section having an internal circumferential groove; a pin section receivable in said box section and having an external circumferential groove; said grooves each defined by two side walls and a bottom wall; a normally expanded contractable split latch ring in said external groove; means for contracting said split ring upon movement of said pin section into said box section, said split ring expanding partially into said internal groove when said grooves are laterally aligned; and lock means removably disposable between said ends of said latch ring when said sections are latched together by said latch ring; wherein said lock means comprises a malleable member including a body, a pair of arms projecting oppositely from said body, a thin-walled section connecting said arms to said body, said arms having end extensions including portions engageable beneath the ends of said ring, and surfaces movable into abutting relation with the ends of said ring.

16. A tool joint as defined in claim 15; wherein said arms also include abutment portions movable upon spreading of said arms into abutting relation to said body.

17. A tool joint as defined in claim 15, wherein said body has a threaded bore opening into said external groove for reception of a threaded pulling device.

18. In a tool joint: a box section having an internal circumferential groove; a pin section receivable in said box section and having an external circumferential groove; said grooves each defined by two side walls and a bottom wall; a normally expanded contractable split latch ring in said external groove; means for contracting said split ring upon movement of said pin section into said box section, said split ring expanding partially into said internal groove when said grooves are laterally aligned; and lock means movable radially into said external groove and between said ends of said latch ring when said sections are latched together by said latch ring to retain said latch ring in its expanded condition in said internal groove; wherein said lock means comprises a body and a pair of arms projecting from said body for engagement with the bottom wall of said external groove, said arms being spreadable by said bottom wall into engagement with the ends of said split ring upon radial movement of said body into said external groove.

References Cited

UNITED STATES PATENTS

| | | | |
|---|---|---|---|
| 239,827 | 4/1881 | Newman | 285—321 X |
| 2,590,565 | 3/1952 | Osborn | 285—39 |
| 3,352,576 | 11/1967 | Thorne-Thomsen | 285—321 X |
| 3,356,389 | 12/1967 | Fredd | 285—91 X |
| 3,381,983 | 5/1968 | Hanes | 285—321 |
| 3,030,159 | 4/1962 | Barnhart | 85—8.8 X |

FOREIGN PATENTS

| | | |
|---|---|---|
| 1,333,552 | 6/1963 | France. |
| 570,671 | 7/1945 | Great Britain. |

DAVID J. WILLIAMOWSKY, Primary Examiner

D. W. AROLA, Assistant Examiner

U. S. Cl. X.R.

285—39. 91. 321